(12) United States Patent
Kim et al.

(10) Patent No.: US 7,006,137 B2
(45) Date of Patent: Feb. 28, 2006

(54) MICRO MODE FOCUSING APPARATUS FOR DIGITAL STILL CAMERA USING FOCUS DRIVING MOTOR

(75) Inventors: Young Jun Kim, Suwon-Shi (KR); Joon Hyuk Han, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 686 days.

(21) Appl. No.: 09/854,704

(22) Filed: May 14, 2001

(65) Prior Publication Data
US 2002/0075393 A1 Jun. 20, 2002

(30) Foreign Application Priority Data
Dec. 15, 2000 (KR) .............................. 2000-76791

(51) Int. Cl.
*H04N 5/225* (2006.01)
(52) U.S. Cl. ...................................... 348/335; 348/374
(58) Field of Classification Search ................ 396/111, 396/118, 133, 535, 79, 144, 83, 82; 359/823, 359/824, 826, 696, 698, 699, 829; 348/335, 348/340, 345, 357, 374, 351
See application file for complete search history.

(56) References Cited
U.S. PATENT DOCUMENTS

| | | | |
|---|---|---|---|
| 5,101,278 A | * | 3/1992 | Itsumi et al. ................ 348/357 |
| 5,298,933 A | * | 3/1994 | Chigira ......................... 396/82 |
| 5,400,073 A | * | 3/1995 | Morioka et al. ............. 348/335 |
| 5,416,519 A | * | 5/1995 | Ohtake ......................... 348/351 |
| 5,592,250 A | * | 1/1997 | Shimizu ....................... 396/79 |
| 5,886,830 A | * | 3/1999 | Oono et al. .................. 359/696 |
| 5,969,760 A | * | 10/1999 | Ernest et al. ............... 348/357 |
| 6,055,378 A | * | 4/2000 | Oono et al. ................... 396/82 |
| 6,067,421 A | * | 5/2000 | Kitazawa et al. ........... 396/133 |
| 6,366,323 B1 | * | 4/2002 | Shono ......................... 348/340 |

* cited by examiner

*Primary Examiner*—Ngoc-Yen Vu
*Assistant Examiner*—Justin Misleh
(74) *Attorney, Agent, or Firm*—Darby & Darby

(57) ABSTRACT

A micro mode executing apparatus of a digital still camera has an image sensor and a focus controlling lens connected to a focus driving motor and a spindle of the motor, thereby controlling an optical length within the range of a fixed barrel structure. The micro mode executing apparatus a motor that moves along a rotating axis of the spindle with a rotating direction of the motor being changed in accordance with an applied electrical signal. An image sensory is mounted integrally onto one side of the motor through a fixing member and acts to convert an image of an object to an electrical signal. A focus lens is positioned on the same optical axis as the image sensor and is secured to one end of the rotating axis of the spindle. A housing consisting of a first step region for limiting a transferring area of the motor and a second step region for limiting a transferring area of the focus lens, wherein the first and second step regions form a barrel structure having a step layer. A first biasing member is connected to the focus lens and the motor, and has a constant biasing force; and a second biasing member is provided for positioning the motor on the first step region for applying a biasing force in a lateral direction.

3 Claims, 2 Drawing Sheets

MICRO MODE FOCUSING APPARATUS FOR DIGITAL STILL CAMERA USING FOCUS DRIVING MOTOR

BACKGROUND OF THE INVENTION

1. Field of the Invention

The present invention relates to an electronic still camera, and in particular to a micro mode executing apparatus of a digital still camera, in which an image sensor and a focus controlling lens are connected to a focus driving motor and a spindle of the motor, thereby controlling an optical length within a range of not changing a barrel structure.

2. Description of the Prior Art

Recently, while electronic still cameras recording a still image on a magnetic disc in a form of an electrical image signal have been developed, the electronic still camera has to control the focusing by moving a focus ring of the photographing lens, such as a typical still camera using a silver-salt film.

In that case, the automatic focusing control may be performed by an automatic focus mechanism. The automatic focus mechanism detects the distance from the camera to a subject and moved the focus ring of the photographing lens based on the distance information.

Meanwhile, in a video camera, a photographing signal itself detects a focus information for an automatic focus control to perform the automatic focus control without detecting the distance. Specifically, when the focus control of the lens is proper so that the profile of the subject can be photographed distinctly, there is no high band frequency component in the photograph signal. When the focus control of the lens is not proper, since the profile of the subject is blurred, there is a high band frequency component in the signal.

Accordingly, the automatic focus control is performed by detecting the amount of a high band frequency components contained in the photographing signal to determine whether the state of the focus control is proper or not.

A zoom lens is widely used as a photographing lens mounted onto the camera. Using such a zoom lens, a focusing distance may be successively varied, so that a photography can be achieved in an optional viewing angle between a wide angle and a telescope angle.

However, in the zoom lens, if the focus distance is varied, there is a problem in that the focus position is also varied. Specifically, since it adjusts accurately the focus of the subject before varying the focus distance, although there is no variation of the distance from the camera to the subject, the focus of the subject is deviated, if the focus distance is varied.

In the typical zoom lens, in order to prevent the focus from being deviated, if a zoom ring for adjusting a focus distance rotates, a focus adjusting lens is gradually moved by components, such as a cam groove, so that the focus position may be compensated in line with the variation of the focus distance.

As shown in FIG. 1, in a high-grade camera, an application of a micro mode increases the ability to photograph an object that is close to the camera, i.e. not far off a limited distance predetermined in the lens design. Such a micro mode photographs a near object by extending a the total length of the camera optical system, while allowing degradation of the photographing performance of the lens.

With reference to FIG. 1, a position of the focus on which the object OBJ is photographed on a position of a normal lens LENS is designated by a reference numeral F1. At that time, if the lens is moved forwardly, the distance between the object OBJ and the lens is shortened to vary the position of the focus of the object to be photographed.

Accordingly, although the lens moves substantially, supposing that the position of the lens is fix as shown in FIG. I, the object OBJ moves relatively to the lens to produce a virtual image of the object designated by a reference numeral IOBJ. Therefore, the focus of the object to be photographed by the virtual image of the object is positioned as a reference numeral F2.

Specifically, in the electronic still camera, in order to move the lens from or to the image sensor, the camera has to have two lenses as shown in FIG. 2, and a transferring guide member having a barrel structure to transfer or moved.

The application of the micro mode of the conventional electronic still camera will be described with reference to FIG. 2.

The focusing mode of the conventional electronic still camera includes an object lens Lo faced to the object, and an image lens Li faced to an image sensor IS. The focusing mode is determined by transferring or moving any of the lenses.

In case of transferring the image lens Li to apply the micro mode, there is an advantage in that since the image lens and the object lens have a stable position due to the solidity of the barrel structure as shown in FIG. 2, the performance of the camera can be constantly maintained. Also, the transferred image lens is secured to have an optical stability.

However, there is a disadvantage in that since the distance FL between the image sensor and the object lens is fixed, the camera does not satisfy the anticipation of the micro mode.

SUMMARY OF THE INVENTION

It is, therefore, an object of the present invention to provide a micro mode executing apparatus of a digital still camera, in which an image sensor and a focus controlling lens are connected to a focus driving motor and a spindle of the motor, thereby controlling an optical length within a range set by a barrel structure.

To achieve the above object, according to one aspect of the present invention, there is provided a micro mode executing apparatus for a digital still camera, the apparatus comprising: a focus lens and an image sensor arranged sequentially with an optical axis passing through centers of the lens and the sensor; transferring means, provided integrally an the image sensor for transferring the focus lens and the image sensor along the optical axis; a first transferring area defining portion of the structure for defining a transferring area of the focus lens transferred by the transferring means; a second transferring area defining portion of the structure for defining the transferring area of the focus leans transferred horizontally along the optical axis by the transferring means, when the focus lens is not further transferred by the first transferring area defining portion; and transferring movement limiting means for preventing the image sensor from transferring when the focus lens is transferred in an area defined by the first transferring area defining portion according to the operation of the transferring means.

According to another aspect of the present invention, there is provided with a micro mode executing apparatus for a digital still camera, the apparatus comprising: a motor transferred along a rotating axis of a spindle with a rotating direction of the motor being changed in line with an applied electrical signal with reference to the rotating axis of the spindle; an image sensor, mounted integrally onto one side of the motor through a fixing member, for converting an image of an object to be photographed to an electrical signal; a focus lens positioned on a same optical axis as the image sensor and secured to one end of the rotating axis of the spindle; a housing consisting of a first step region for limiting a transferring area of the motor and a second step region for limiting a transferring area of the focus lens, the first and second step region forming a barrel structure having a step layer; a first biasing member connected to the focus lens and the motor and having a constant biasing force; and a second biasing member for positioning the motor on the first step region by applying a biasing force to a lateral direction.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

Preferred embodiment of the present invention will now be described with reference to the accompanying drawings.

Figure 1:
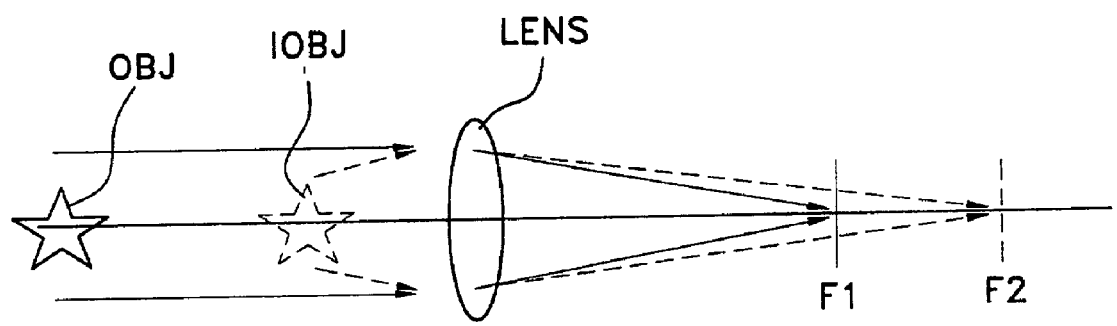
FIG. 1 is a view illustrating a micro mode.
Figure 2:
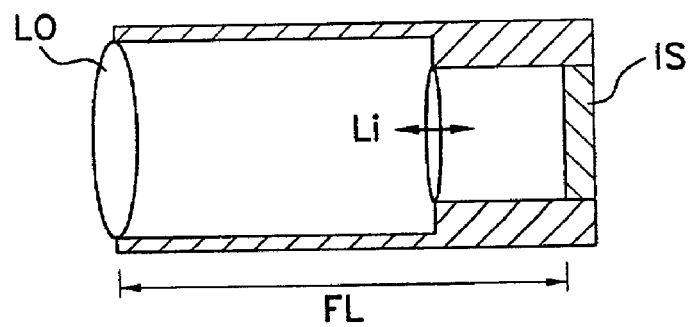
FIG. 2 is a cross sectional view illustrating a barrel structure of a conventional focus controlling method.
Figure 3:
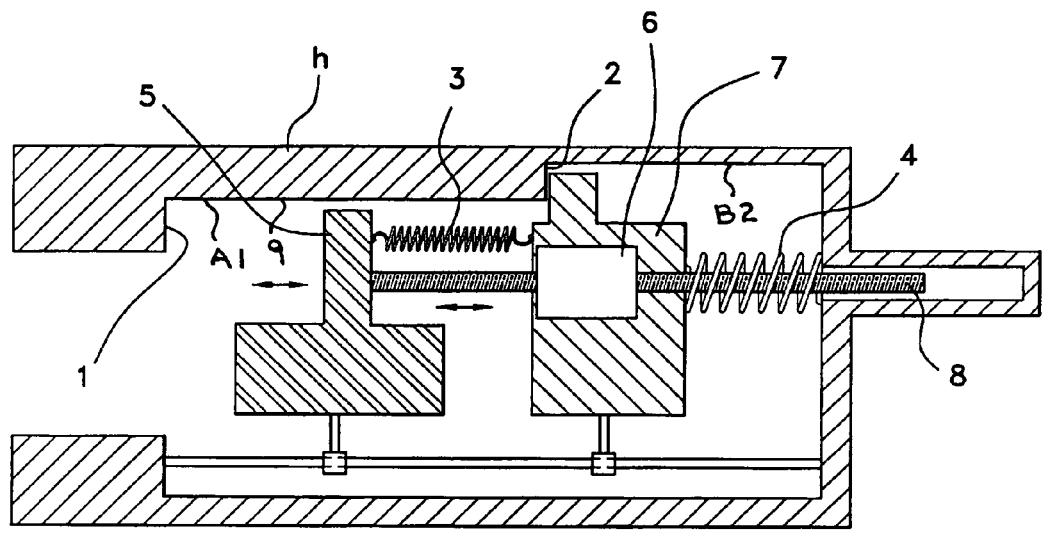
FIG. 3 is a cross sectional view illustrating a normal state of a micro mode executing apparatus of a digital still camera having a focus driving motor according to the present invention.
Figure 4:
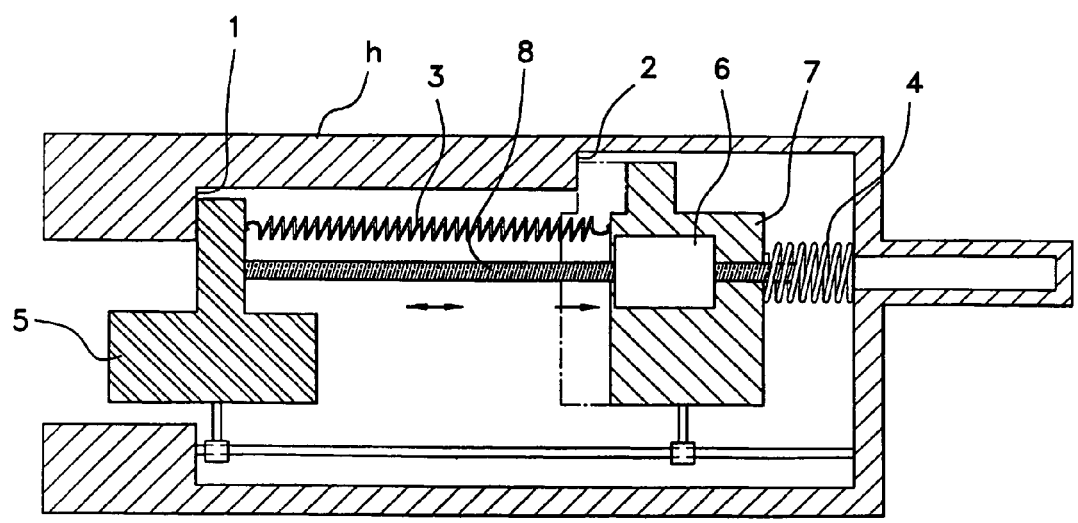
FIG. 4 is a cross sectional view illustrating an expanded state of a maximum optical path of a micro mode executing apparatus of a digital still camera having a focus driving motor according to the present invention.

FIG. 3 is a cross sectional view illustrating a normal state of a micro mode executing apparatus of a digital still camera having a focus driving motor according to the present invention, and FIG. 4 is a cross sectional view illustrating an expanded state of a maximum optical path of the micro mode executing apparatus of the digital still camera having the focus driving motor according to the present invention.

Referring to FIGS. 3 and 4, the focus driving motor comprises a focusing motor 6 moved along a focusing motor spindle 8 by having its rotating direction changed according to an applied electrical signal. An image sensor module 7 is integrally mounted on one side of the focusing motor through a fixing member so as to convert an image of an object to be photographed to an electrical signal. A focus lens module 5 is positioned on a same optical axis as the image sensor module 7 and is secured to one end of the focusing motor spindle 8. A housing h, consisting of a housing B 2 for limiting a transferring area of the focusing motor 6, a housing A 1 for limiting a transferring area of the focus lens 5, and a barrel structure 9 having a step 2. A first spring 3 is connected to the focus lens module 5 and the focusing motor 6 and has a constant biasing force. A second spring 4 positions the motor on the housing B 2 by applying a biasing force in a lateral direction.

The operation of the micro mode executing apparatus of the digital still camera using the focus driving motor according to the present invention will now be explained.

In case of a typical photograph, as shown in FIG. 3, the image sensor module 7 is fixed on a surface of the housing B 2 by the second spring 4, and the focus lens module 5 close to a distal end of the spindle 8 of the focusing motor 6 by the first spring (1) 3 to bring to the image to a focus by movement of the spindle of the focusing motor.

At that time, the motor 6 is fixed to the image sensor module 7, and uses a motor movable perpendicular to a rotating surface of the focusing motor spindle 8 in response to the rotation of the focusing motor 6.

The first spring 3 serves as a pulling member far attracting the focus lens module 5 and the image sensor module 7, so that the focus lens module 5 moves in close to the focusing motor spindle 8. In addition, the second spring 4 serves as a fixing member for fixing the image sensor module 7 to the surface of the housing B 2 when not in the micro mode, and also serves as a contacting member for contacting the image sensor module 7 and the focus lens module 5 to the surface of the housing A 1 when in the micro mode.

Since the optical system is extended, in order to accomplish the micro mode, the object to be photographed moves gradually toward the lens, so that the focus lens module 5 is close to the housing A 1. After the focus lens module 5 is a close to the housing A 1, the focusing motor 6 rotates so as to compress further the second spring 4, thereby moving the image sensor module 7.

Providing a digital still camera using the focus driving motor according to the present invention with the micro mode executing apparatus, the image sensor module 7 is fixed to the housing B 2 when the micro mode is not in use while the image sensor module 7 moves only when in the micro mode, thereby securing the stable photographing performance.

Also, since the image sensor module 7 is driven through the focusing motor 6, there is no needed for a separate driving motor for executing the micro mode.

In addition, since the micro mode is executed using the focusing motor 6, an auto focusing function using the focusing motor 6 can be adapted at the micro mode.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A micro mode executing apparatus for a digital still camera, the apparatus comprising:

a motor transferred along a rotating axis of a spindle with a rotating direction of the motor being changed in accordance with an applied electrical signal with reference to the rotating axis of the spindle;

an image sensor, mounted integrally onto one side of the motor through a fixing member, for converting an image of an object to be photographed to an electrical signal;

a focus lens positioned on the same optical axis as the image sensor and secured to one end of the rotating axis of the spindle;

a housing having a first step region for limiting a transferring area of the motor and a second step region for limiting a transferring area of the focus lens, the first and second step region forming a barrel structure having a step layer;

a first biasing member connected to the focus lens and the motor and having a constant biasing force; and a second biasing member for positioning the motor on the first step region by applying a biasing force to a lateral direction.

2. A micro mode executing apparatus for a digital still camera as claimed in claim 1 wherein the first and second biasing members are springs.

3. A micro mode executing apparatus for a digital still camera as claimed in claim 1 wherein the second biasing member is a spring connected between the housing and the image sensor.

* * * * *

UNITED STATES PATENT AND TRADEMARK OFFICE
CERTIFICATE OF CORRECTION

| | |
|---|---|
| PATENT NO. | : 7,006,137 B2 |
| DATED | : February 28, 2006 |
| INVENTOR(S) | : Young Jun Kim et al. |

It is certified that error appears in the above-identified patent and that said Letters Patent is hereby corrected as shown below:

Title page,
Item [54], Title, delete "MICRO MODE FOCUSING APPARATUS FOR DIGITAL STILL CAMERA USING FOCUS DRIVING MOTOR" and substitute
-- MICRO MODE EXECUTING APPARATUS OF DIGITAL STILL CAMERA USING FOCUS DRIVING MOTOR --.

Signed and Sealed this

Sixteenth Day of May, 2006

JON W. DUDAS
*Director of the United States Patent and Trademark Office*